US008202606B2

(12) United States Patent
Krahn

(10) Patent No.: US 8,202,606 B2
(45) Date of Patent: Jun. 19, 2012

(54) INSULATION STRUCTURE FOR RESISTOR GRIDS

(75) Inventor: John Raymond Krahn, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 19 days.

(21) Appl. No.: 12/752,289

(22) Filed: Apr. 1, 2010

(65) Prior Publication Data

US 2011/0244178 A1 Oct. 6, 2011

(51) Int. Cl.
*B32B 3/20* (2006.01)
*B32B 3/10* (2006.01)
*B32B 3/00* (2006.01)

(52) U.S. Cl. ......................... 428/188; 428/131; 428/166

(58) Field of Classification Search .................. 428/131, 428/137, 138, 166, 188, 178; 52/783.1, 793.1, 52/793.11, 794.1
See application file for complete search history.

(56) References Cited

U.S. PATENT DOCUMENTS

| | | | | |
|---|---|---|---|---|
| 2,528,049 | A * | 10/1950 | Gonda | 181/292 |
| 4,665,678 | A * | 5/1987 | Muller et al. | 52/793.1 |
| 4,732,796 | A | 3/1988 | Schatschneider | |
| 5,600,930 | A * | 2/1997 | Drucker | 52/585.1 |
| 5,744,225 | A | 4/1998 | Kujirai et al. | |
| 6,986,367 | B2 | 1/2006 | Toas et al. | |
| 2005/0255284 | A1 | 11/2005 | Pritchett | |
| 2009/0130389 | A1 | 5/2009 | Whitaker et al. | |
| 2009/0260751 | A1 | 10/2009 | Whitaker et al. | |

* cited by examiner

*Primary Examiner* — Catherine A Simone
(74) *Attorney, Agent, or Firm* — Joseph J. Christian

(57) ABSTRACT

An insulation board for a resistor grid and a method of constructing the same are disclosed. The insulation board includes one or more longitudinal voids. Longitudinal structural members are disposed within the longitudinal voids, wherein the cross section of the longitudinal structural members conforms to the profile of the longitudinal voids. The insulation board also includes one or more rows of transverse pin holes for engaging one or more resistive elements of the resistor grid, disposed along the length of the insulation board.

9 Claims, 5 Drawing Sheets

INSULATION STRUCTURE FOR RESISTOR GRIDS

BACKGROUND

Various heavy duty high-current industrial equipment dissipate excess energy through resistor grids in the form of large amounts of heat. For example, resistor grids are used for controlling loads in cranes, for load testing of generators, for harmonic filtering in electric substations, for neutral grounding in industrial AC distribution, for dynamic braking on locomotives and so forth.

A resistor grid is a large, usually air or oil cooled grid of metal alloy ribbons or plates, formed as a serpentine structure. The ribbons may have pins at each end for mounting onto an insulation board. The insulation board provides a sturdy frame for the resistor grid and maintains a fixed, safe separation between ribbons, as well as between successive grids when used in a grid stack configuration. The insulation board may be made of a suitable insulating material such as fiber glass, silicon-bonded mica, thermoplastic or thermoset polymers, including silicones and polyesters, all of which may be filled with higher temperature compounds like glass, fiber glass, mica, alumina, silica, and the like. The resistor grid provides little electrical resistance and may carry currents as large as a several hundred or even thousands of amperes. Neighboring ribbons may have a potential difference of a few volts. Such operating parameters may cause arcing between neighboring ribbons or thermal runaway if the ribbons are too close, and especially if they are allowed to touch. Therefore, the structural integrity of the insulation board is critical.

Under normal operating conditions, the resistor grids are typically subject to air temperatures between 200 and 400 degrees centigrade, but may be higher. These high temperatures may cause thermal degradation and/or distortion of the insulation board. If the insulation board distorts or degrades, then pin-out of ribbons may occur. This may further lead to relative motion of the ribbons, electrical arcing, thermal runaway, and subsequent deterioration and ultimate failure of the resistor grid. Furthermore, the failures can produce sparks and molten steel which may be ejected in the air cooling stream. These ejected particulates pose a safety hazard and may cause wayside fires, in the case of locomotive dynamic braking grids.

Insulation boards made of materials that can withstand higher temperatures are expensive.

For these and other reasons, there is a need for the current invention.

BRIEF DESCRIPTION OF THE INVENTION

An insulation board for a resistor grid and a method of constructing the same are disclosed. The insulation board includes one or more longitudinal voids. Longitudinal structural members are disposed within the longitudinal voids, wherein the cross section of the longitudinal structural members conforms to the profile of the longitudinal voids. The insulation board also includes one or more rows of transverse pin holes for engaging one or more resistive elements of the resistor grid, disposed along the length of the insulation board.

DETAILED DESCRIPTION OF THE INVENTION

Embodiments of the present invention provide an improved design of an insulation board for resistor grids and methods of manufacturing the insulation board.

Figure 1:
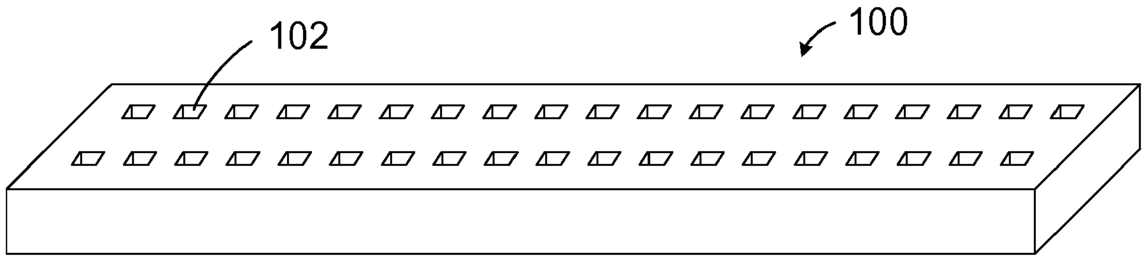
FIG. 1 shows an exemplary insulation board used in resistor grids.

FIG. 1 shows an insulation board 100, according to one embodiment of the present invention. The insulation board 100 may be made of an electrical insulation material resistant to thermal degradation. The insulation board 100 includes one or more rows of transverse pin holes 102 disposed along the length of the insulation board 100. The pin holes 102 engage pins of resistive elements of the resistor grid. The insulation board 100 provides a substantially rigid support for mounting the resistive elements and maintains a fixed separation between the resistive elements of the resistor grid. The durability of the insulation board 100 is of importance for longevity and proper functioning of the resistor grid. Pin holes 208, 308, 408, 508 are also shown in embodiments depicted in FIGS. 2-5 respectively.

Figure 2:
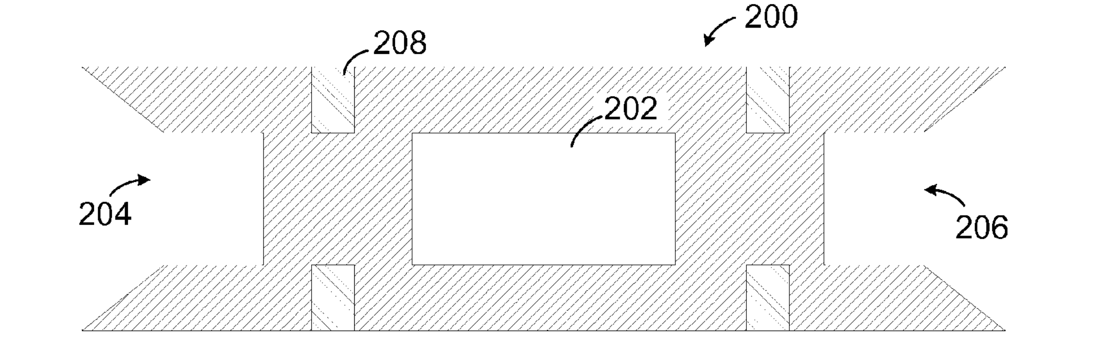
FIG. 2 shows the cross section of an insulation board according to an embodiment of the present invention.

FIG. 2 shows a cross section 200 of the insulation board according to an embodiment of the present invention. The cross section illustrates longitudinal voids 202, 204, and 206 in the insulation board. The insulation board may be made of electrically insulating materials such as, but not limited to, fiber glass, glass, ceramics, glass filled thermoplastic polymers, thermoset polymers, silicones, vinyl esters, and the like. The longitudinal void 202 is rectangular in section. The voids 204 and 206 have a complex section. The sectional shape and dimensions of the longitudinal voids 202, 204, and 206 may be selected to reduce a desired amount of insulating material from the insulation board, without detrimentally reducing breakdown voltage of the insulation board. In other words, the amount of insulating material removed from the insulation board is such that the breakdown, and flashover voltage of the insulation board still exceeds the normal operating voltage of the resistor grid by a predetermined overvoltage safety limit. In addition, necessary electrical creepage path lengths need to be maintained which are consistent with the expected contamination level and design requirements. The longitudinal voids 202, 204, and 206 reduce the amount of insulating material used for the insulation board. The reduction in the amount of insulating material may allow the use of a higher grade insulating material capable of sustaining higher temperatures without suffering heat distortion and thermal degradation. The higher grade insulating material may also have high structural strength. The reduction in the amount of insulating material required offsets increase in costs associated with using the higher grade insulating material.

The longitudinal voids 202, 204, and 206 may or may not run the entire length of the insulation board. In various embodiments, the longitudinal voids 202, 204, and 206 may be absent at the ends of the insulation board. In other embodiments, the longitudinal voids 202, 204 and 206 may run the entire length of the insulation board.

Figure 3:
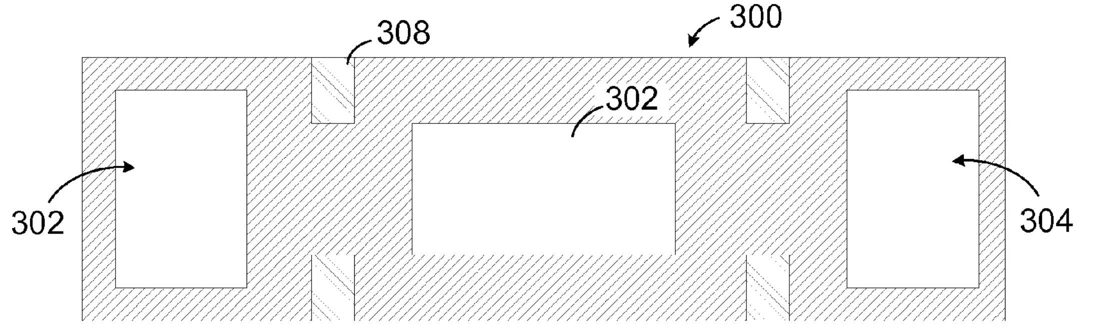
FIG. 3 shows the cross section of an insulation board according to another embodiment of the present invention.

In the embodiment illustrated in FIG. 2, the longitudinal voids 204 and 206 are placed on the outer longitudinal sides of the insulation board. In some other embodiments, the longitudinal voids 204 and 206 may be placed entirely within the insulation board. FIG. 3 illustrates one such embodiment where the voids may be placed entirely within the insulation board.

In the embodiment illustrated in FIG. 2, the longitudinal voids 202, 204 and 206 have uniform cross section over the entire length of the voids. In some embodiments, the longitudinal voids 202, 204, and 206 may have different cross sections over the length of the voids.

Structural strength of the insulation board may be improved by disposing one or more longitudinal structural members within the voids 202, 204, and 206. In some embodiments, a longitudinal structural member may be disposed only within the longitudinal voids 204 and 206. The longitudinal void 202 may be left empty. In other embodiments, longitudinal structural members may be disposed within each of the voids 202, 204, and 206. In various embodiments, the longitudinal structural members may be standard tube stock. The gauge and wall thickness of the tube stock may be chosen according to structural strength requirements for the insulation board. In other embodiments, the longitudinal structural members may be standard rod stock. In yet other embodiments, the longitudinal structural members may be beams, angles, or channels. The dimensions of the beams, angles, and channels may be chosen according to the structural strength requirements for the insulation board.

Figure 8:
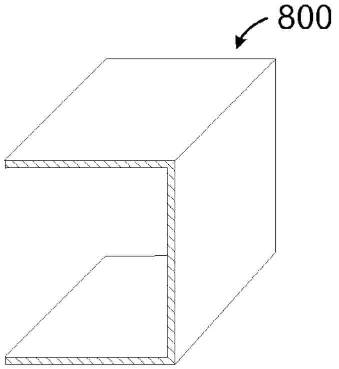
FIG. 8 shows an example longitudinal structural member according to yet another embodiment of the present invention.

In various embodiments, multiple resistor grids may be placed close to each other to form a stacked resistor grid. In such embodiments, considerations for electrical creepage path between the insulation boards of adjacent resistor grids may prescribe that longitudinal structural members of reduced or different cross section be used. For instance, a C section channel (as shown in FIG. 8) may be disposed in the longitudinal voids 204 and 206, such that the channel occupies only the C section of the longitudinal voids 204 and 206.

Further, in various embodiments, the longitudinal structural members may not run up to the ends of the insulation board. In one embodiment, the longitudinal voids 202, 204, and 206 may run the entire length of the insulation board, however the longitudinal structural members disposed therein may not run up to the ends of the longitudinal voids 202, 204, and 206. In other embodiments, the longitudinal structural members may run the entire length of the insulation board.

The longitudinal structural members may have substantially equal stiffness. Structural members having substantially equal stiffness may help in distributing the load evenly across the insulation board, and reduce or prevent the warping or buckling of the insulation board due to mechanical load and heat. The longitudinal structural members may have substantially higher stiffness than the electrical insulation material used in the insulation board, to maintain the required structural integrity of the insulation board, specially at elevated temperatures, where the electrical insulation material is prone to degradation and distortion.

The longitudinal structural members may be made of an inexpensive material, such as metals including, without limitation, iron and steel. Alternatively, the longitudinal structural members may be made of non-metallic materials such as, but not limited to, fiber glass, weave board, carbon fiber and so forth.

Figure 4:
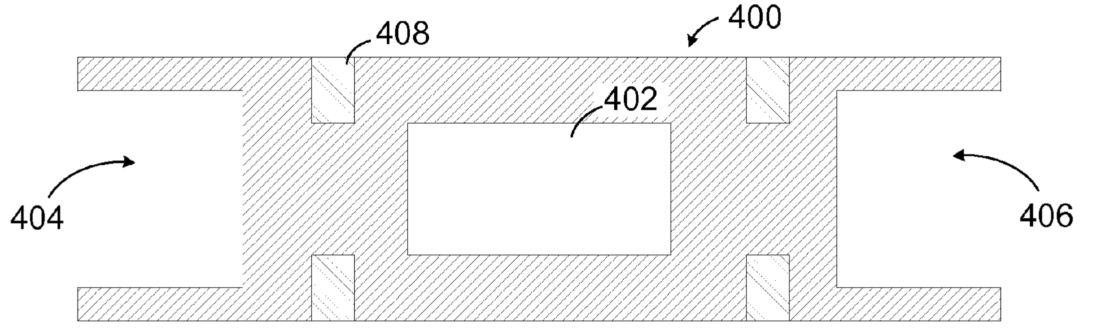
FIG. 4 shows the cross section of an insulation board according to yet another embodiment of the present invention.
Figure 5:
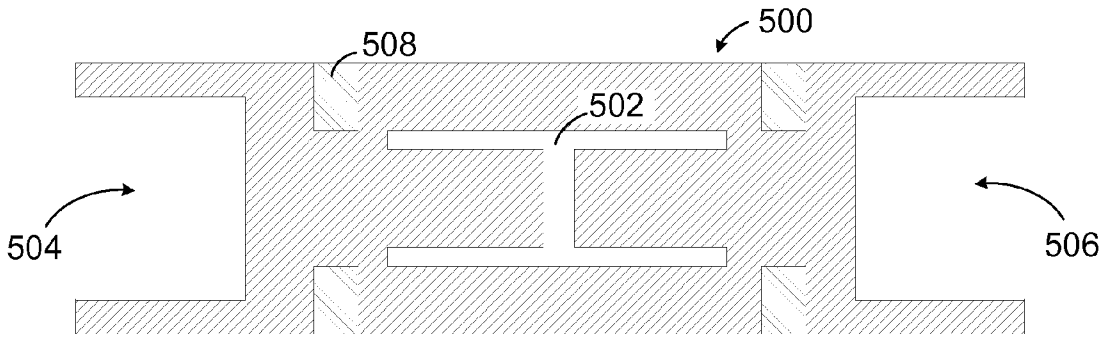
FIG. 5 shows the cross section of an insulation board according to yet another embodiment of the present invention.

FIG. 3, FIG. 4, and FIG. 5 show the cross sections 300, 400, and 500 respectively of various insulation boards in accordance with other embodiments of the present invention. FIG. 3, FIG. 4, and FIG. 5 illustrate different positions of the longitudinal voids, such as within the insulation board, or on the outer longitudinal edge of the insulation board, different shapes of the longitudinal voids, and different types of longitudinal structural members disposed within the voids. FIG. 3, FIG. 4, and FIG. 5 illustrate embodiments of the insulation board having varying amounts of reduction in the insulation material. It will be appreciated that any other arrangements and shapes of the longitudinal voids and longitudinal structural members may be used for the insulation board, without deviating from the spirit of the present invention.

Figure 6:
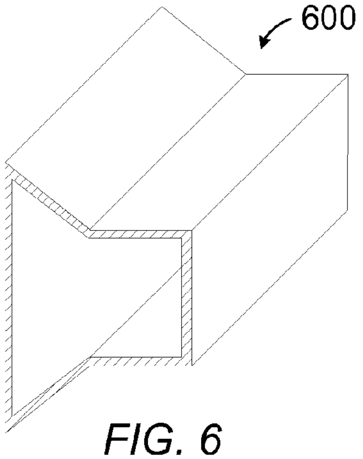
FIG. 6 shows an example longitudinal structural member according to one embodiment of the present invention.
Figure 7:
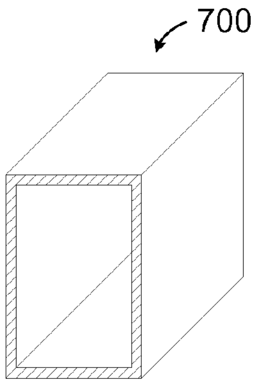
FIG. 7 shows an example longitudinal structural member according to another embodiment of the present invention.
Figure 9:
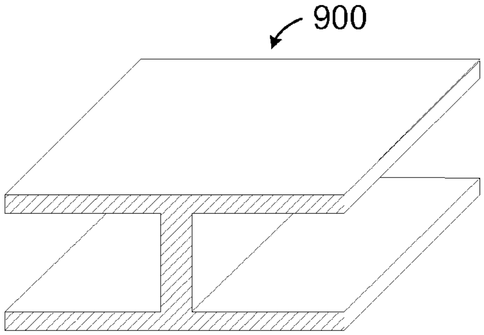
FIG. 9 shows an example longitudinal structural member according to yet another embodiment of the present invention.

FIGS. 6-9 illustrate example longitudinal structural members that may be disposed in the longitudinal voids. FIG. 6 illustrates an example longitudinal structural member 600 that may be disposed in the longitudinal voids 204 and 206 illustrated in FIG. 2. FIG. 7 illustrates an example longitudinal structural member 700 that may be disposed in the longitudinal voids 304 and 306 illustrated in FIG. 3. FIG. 8 illustrates an example longitudinal structural member 800 that may be disposed in the longitudinal voids 404 and 406 illustrated in FIG. 4, and the longitudinal voids 504 and 506 illustrated in FIG. 5. In some embodiments, the longitudinal structural member 800 may be disposed in the longitudinal voids 204 and 206 illustrated in FIG. 2. The longitudinal structural member 800 occupies only part of the longitudinal voids 204 and 206. In other words, the longitudinal structural member 800 occupies only the C section of the longitudinal voids 204 and 206. Such partial occupancy of the longitudinal structural member 800 in the longitudinal voids 204 and 206 may be required to conform with the electrical creepage path requirements, for instance, when multiple resistor grids may be placed in a stacked configuration. FIG. 9 illustrates an example longitudinal structural member 900 that may be disposed in the longitudinal void 502 illustrated in FIG. 5.

Figure 10:
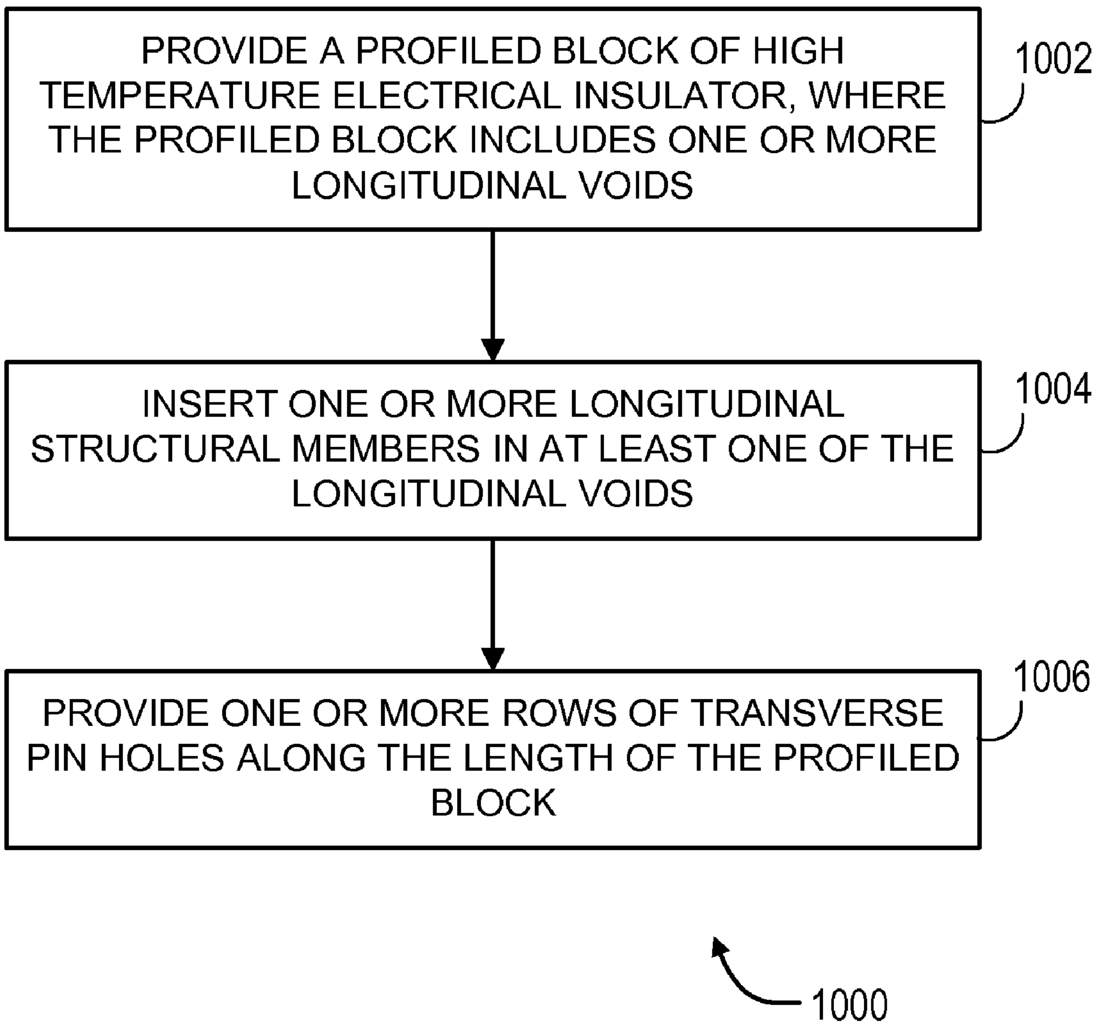
FIG. 10 shows a flow chart of a method for manufacturing an insulation board according to an embodiment of the present invention.

FIG. 10 shows the flow chart of an example process 1000 for constructing the insulation board, in accordance with one embodiment. The process 1000 may be used to construct an insulation board where the longitudinal structural members may run the entire length, or nearly the entire length of the insulation board, or the longitudinal structural members may be placed on the outer longitudinal sides of the insulation board, or both.

In step 1002 a profiled block is provided. The profiled block is made of a high temperature electrical insulator such as, but not limited to, electrical grade silicone resin. The profiled block may be made by molding the high temperature electrical insulator using molding techniques such as, but not limited to, injection molding, compression molding, and so forth. In some embodiments, the profiled block may be formed using fiber glass or weave board, and over molded with electrical grade silicon resin. In various embodiments, the profiled block may further have one or more longitudinal voids. The longitudinal voids may or may not run the entire length of the profiled block. Further, the longitudinal voids may be placed entirely within the profiled block, or may be placed on the outer longitudinal sides of the profiled block.

In step 1004 of one or more longitudinal structural members are inserted in at least one of the voids of the profiled block. In various embodiments, the cross section of the longitudinal structural members may conform to the profile of the voids in which the longitudinal structural members are inserted. The longitudinal structural members may simply be inserted into the voids. Alternatively, the longitudinal structural members may be cooled down first such that the longitudinal structural members contract, thus facilitating easy insertion into the voids.

The longitudinal structural members may be any one of, but not limited to, a beam, a channel, an angle, a tube or a rod. The longitudinal structural members are inserted for providing additional mechanical strength to the profiled block. The longitudinal structural members may have substantially equal stiffness and mechanical strength. In an embodiment of the present invention, the longitudinal structural members may be made of metal. In an alternate embodiment of the present invention, the longitudinal structural members may be made of glass fiber.

In step 1006, one or more rows of transverse pin holes are provided on the profiled block. The pin holes engage the resistive elements of the resistor grid. The number of rows of pins holes on the profiled block may vary depending on the number of fastening pins disposed on the said resistive elements. In one embodiment, the pin holes are machined into the profiled block. In other embodiments, the provision for pin holes is made in the mold used for providing the profiled block in step 1002.

Figure 11:
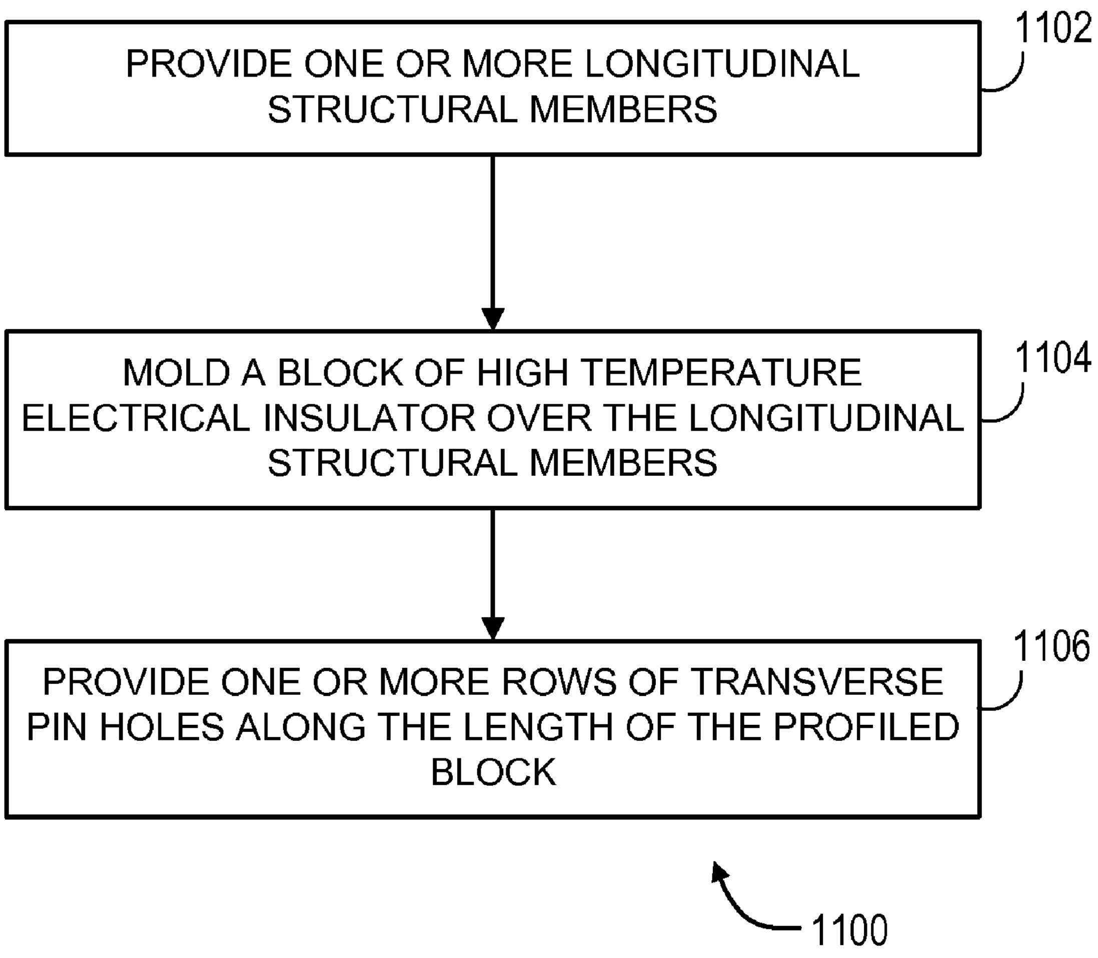
FIG. 11 shows a flow chart of a method for manufacturing an insulation board according to an embodiment of the present invention.

FIG. 11 shows a flow chart of another example process 1100 for constructing the insulation board. The process 1100 may be used, for example, to construct an insulation board where the longitudinal structural members may not run the entire length of the insulation board, or the longitudinal structural members are disposed entirely within the insulation board, or both.

In step 1102, one or more longitudinal structural members are provided. The longitudinal structural members may be, without limitation, beams, channels, angles, tubes, or rods. In some embodiments, the longitudinal structural members may have a complex section. The longitudinal structural members may have substantially equal stiffness. In an embodiment, the longitudinal structural members may be made of a metal such as, but not limited to, iron and steel. In another embodiment, the longitudinal structural members may be made of non-metallic materials such as, but not limited to, fiber glass, weave board, carbon fiber and so forth.

In step 1104 a block of high temperature electrical insulator is molded over the longitudinal structural members. The high temperature electrical insulator may be, without limitation, an electrical grade silicone resin. The block may be made molding using techniques such as, but not limited to, injection molding, compression molding, and so forth. The longitudinal structural members may be positioned within the mold prior to molding.

In step 1106, one or more rows of transverse pin holes are provided on the molded block. The pin holes engage the resistive elements of the resistor grid. The number of rows of pins holes on the molded block may vary depending on the number of fastening pins disposed on the said resistive elements. In one embodiment, the pin holes are machined into the molded block. In other embodiments, the provision for pin holes is made in the mold used for molding the block of electrical grade insulator in step 1104.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. An apparatus comprising:

a substantially planar element having an elongate shape and one or more longitudinal voids therethrough, wherein the substantially planar element is made of an electrically insulating material;

longitudinal structural members disposed within at least one of the one or more longitudinal voids, wherein the cross section of the longitudinal structural members conforms with the profile of the one or more longitudinal voids, wherein the longitudinal structural members are made of a metal; and one or more rows of transverse pin holes, configured to engage pins of one or more resistive elements of a resistor grid, disposed along the length of the substantially planar element.

2. The apparatus of claim 1, wherein the one or more longitudinal structural members have substantially higher stiffness than the electrically insulating material.

3. The apparatus of claim 1, wherein the one or more longitudinal structural members comprise one of a beam, a channel, an angle, a tube, or a rod.

4. The apparatus of claim 1, wherein the electrically insulating material comprises on of fiber glass, glass, ceramics, glass filled thermoplastic polymers, thermoset polymers, silicones, and vinyl esters.

5. The apparatus of claim 1, wherein the one or more rows of transverse pin holes comprise a plurality of rows of transverse pin holes.

6. The apparatus of claim 5, where each of the plurality of rows of transverse pin holes are disposed uniformly along the length of the substantially planar element.

7. The apparatus of claim 1, wherein the transverse pin holes only extend partially through a full depth of the substantially planar element.

8. An apparatus comprising:

a substantially planar element having an elongate shape and one or more longitudinal voids therethrough, wherein the substantially planar element is made of an electrically insulating material;

longitudinal structural members disposed within at least one of the one or more longitudinal voids, wherein the cross section of the longitudinal structural members conforms with the profile of the one or more longitudinal voids; and one or more rows of transverse pin holes, configured to engage pins of one or more resistive elements of a resistor grid, disposed along the length of the substantially planar element, wherein the transverse pin holes only extend partially through a full depth of the substantially planar element.

9. The apparatus of claim 8, wherein the longitudinal structural members are made of one or more of fiber glass, glass, ceramics, glass filled thermoplastic polymers, thermoset polymers, silicones, and vinyl esters.

* * * * *